(12) United States Patent
Liu et al.

(10) Patent No.: US 10,884,164 B2
(45) Date of Patent: Jan. 5, 2021

(54) DISPLAY DEVICE AND VEHICLE

(71) Applicants: Beijing BOE Display Technology Co., Ltd., Beijing (CN); BOE TECHNOLOGY GROUP CO., LTD., Beijing (CN)

(72) Inventors: Song Liu, Beijing (CN); Jinhui Cheng, Beijing (CN); Boxiao Lan, Beijing (CN); Hengyu Yan, Beijing (CN); Zhiming Meng, Beijing (CN)

(73) Assignees: BEIJING BOE DISPLAY TECHNOLOGY CO., LTD., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 125 days.

(21) Appl. No.: 16/176,153

(22) Filed: Oct. 31, 2018

(65) Prior Publication Data
US 2019/0235136 A1    Aug. 1, 2019

(30) Foreign Application Priority Data
Jan. 31, 2018    (CN) .......................... 2018 1 0100373

(51) Int. Cl.
G02B 27/02 (2006.01)
G02B 3/00 (2006.01)
G02B 5/00 (2006.01)

(52) U.S. Cl.
CPC ............ *G02B 3/005* (2013.01); *G02B 5/003* (2013.01); *G02B 27/022* (2013.01)

(58) Field of Classification Search
CPC .............................. G02B 27/02; G02B 27/022
USPC ........ 359/618, 619, 621–624, 628, 740, 742
See application file for complete search history.

(56) References Cited

U.S. PATENT DOCUMENTS

2005/0046951 A1* 3/2005 Sugihara ................ G02B 30/27
359/619

FOREIGN PATENT DOCUMENTS

| CN | 1591088 | A | 3/2005 |
|----|---------|---|--------|
| CN | 1726418 | B | 1/2012 |
| CN | 103514856 | A | 1/2014 |
| CN | 105654874 | A | 6/2016 |
| CN | 105745925 | A | 7/2016 |
| CN | 107193069 | A | 9/2017 |
| DE | 10140688 | A1 | 3/2003 |

(Continued)

OTHER PUBLICATIONS

First Office Action for Chinese Patent Application No. 201810100373.4 dated Sep. 25, 2019.

*Primary Examiner* — Darryl J Collins
(74) *Attorney, Agent, or Firm* — Calfee, Halter & Griswold LLP

(57) ABSTRACT

The present disclosure provides a display device and a vehicle, and relate to the field of display technologies. When the present disclosure is applied to a vehicle, a driver and a passenger may see different images, and thus user experience is enhanced. A display device includes: a display panel and a light adjusting structure arranged at a light exiting side of the display panel. The light adjusting structure is configured to adjust a direction of exit light from the display panel, such that first images displayed by all first display units in the display panel and second images displayed by all second display units in the display panel are respectively transmitted to a first visible area and a second visible area.

18 Claims, 7 Drawing Sheets

(56) References Cited

FOREIGN PATENT DOCUMENTS

JP 2008233180 A 10/2008

\* cited by examiner

DISPLAY DEVICE AND VEHICLE

CROSS-REFERENCE

This application is based upon and claims priority to Chinese Patent Application No. 201810100373.4, filed on Jan. 31, 2018, the entire contents thereof are incorporated herein by reference.

TECHNICAL FIELD

The present disclosure generally relates to the field of display technologies, and more particularly, to a display device and a vehicle.

BACKGROUND

At present, vehicle-mounted display devices gradually become popular for vehicles. In the process of vehicle travelling, passengers other than drivers may watch, for example, movies displayed by the vehicle-mounted display devices. However, the drivers need to watch information related to vehicle driving such as maps, and the drivers are forbidden to watch information unrelated to vehicle driving. Therefore, the drivers and the passengers cannot watch desired information at the same time, which causes poorer user experience.

SUMMARY

Embodiments of the present disclosure provide a display device and a vehicle.

According to a first aspect, there is provided a display device, which includes: a display panel and a light adjusting structure arranged at a light exiting side of the display panel. The light adjusting structure is configured to adjust a direction of exit light from the display panel, such that a first image displayed by all first display units in the display panel and a second image displayed by all second display units in the display panel are respectively transmitted to a first visible area and a second visible area.

In an embodiment, both the first display units and the second display units are arrayed in rows along a first direction. Along a second direction, a first display group constituted by at least one row of the first display units and a second display group constituted by at least one row of the second display units are alternately arranged. The first direction intersects with the second direction.

Further in an embodiment, the first display group is constituted by one row of the first display units; and the second display group is constituted by one row of the second display units.

In an embodiment, the light adjusting structure includes a plurality of lens groups, each of the lens groups includes a first strip-shaped lens and a second strip-shaped lens, and the first strip-shaped lens and the second strip-shaped lens respectively correspond to a group of the first display groups and a group of the second display groups adjacent along the second direction.

Further in an embodiment, the first strip-shaped lens includes a first side perpendicular to the display panel, and the second strip-shaped lens includes a second side perpendicular to the display panel. In each of the lens groups, the first side is parallel and close to the second side. The lens group further includes a first light shielding layer arranged between the first side and the second side and coming into contact with the first side and the second side.

Further in an embodiment, an orthographic projection of the first light shielding layer on the display panel completely overlaps with a black matrix of the display panel.

In an embodiment, along a direction perpendicular to a display surface of the display panel, a height of the first light shielding layer is equal to a maximum height of the first side and the second side.

In an embodiment, both the first strip-shaped lens and the second strip-shaped lens include a right-angled triangle strip-shaped lens.

In an embodiment, both the first strip-shaped lens and the second strip-shaped lens include a fan-shaped strip-shaped lens.

In an embodiment, a second light shielding layer is further arranged between the adjacent lens groups.

In an embodiment, in case that both the first strip-shaped lens and the second strip-shaped lens include the right-angled triangle strip-shaped lens or the fan-shaped strip-shaped lens, the first strip-shaped lens and the second strip-shaped lens further include a rectangular bottom, and the right-angled triangle strip-shaped lens or the fan-shaped strip-shaped lens is arranged on the rectangular bottom. The second light shielding layer is arranged between the rectangular bottoms of the adjacent lens groups.

Further in an embodiment, an orthographic projection of the second light shielding layer on the display panel completely overlaps with the black matrix of the display panel.

In an embodiment, along the direction perpendicular to the display surface of the display panel, the height of the second light shielding layer is equal to that of the rectangular bottom.

In an embodiment, the first display units and the second display units are pixel units.

In an embodiment, the display panel is a liquid crystal display panel or an OLED display panel.

According to a second aspect, there is provided a vehicle, which includes the display device according to the first aspect.

BRIEF DESCRIPTION OF THE DRAWINGS

To describe the technical solutions of the embodiments of the present disclosure or that of the prior art more clearly, the accompanying drawings required for describing the embodiments or the prior art will be briefly introduced below. Apparently, the accompanying drawings in the following description are merely some embodiments of the present disclosure. To those of ordinary skills in the art, other accompanying drawings may also be derived from these accompanying drawings without creative efforts.

DETAILED DESCRIPTION

Technical solutions in the embodiments of the present disclosure will be described clearly and completely below with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

Figure 1:
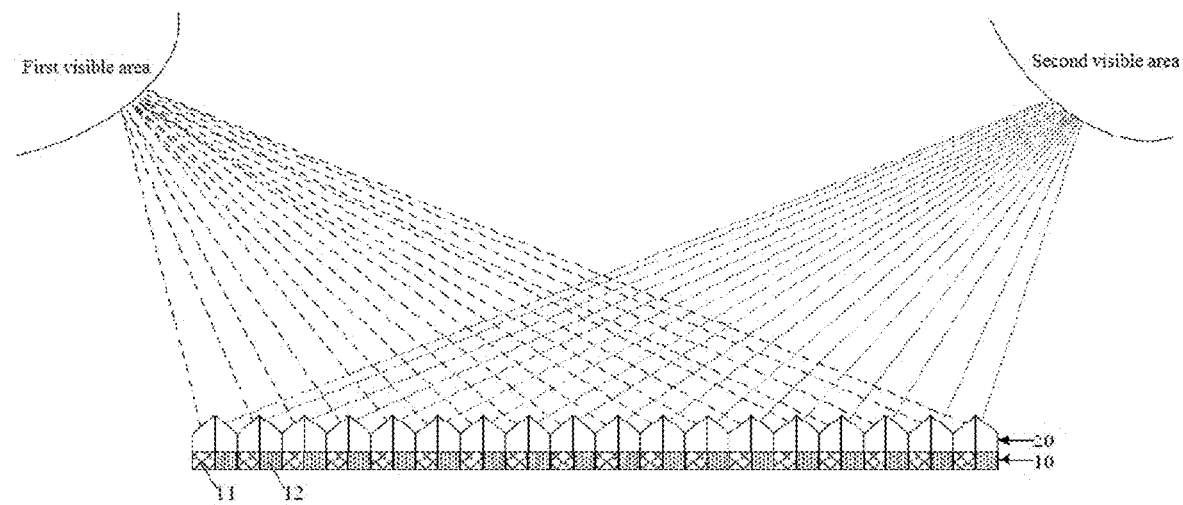
FIG. 1 is a schematic diagram I of a display device according to the present disclosure.

An embodiment of the present disclosure provides a display device as shown in FIG. 1, which includes: a display panel 10 and a light adjusting structure 20 arranged at a light exiting side of the display panel 10. The light adjusting structure 20 is configured to adjust a direction of exit light from the display panel 10, such that a first image displayed by all first display units 11 in the display panel 10 and a second image displayed by all second display units 12 in the display panel are respectively transmitted to a first visible area and a second visible area.

The display panel 10 may be a display panel of any type, and in an embodiment, may be a liquid crystal display panel or an organic light-emitting diode (OLED) display panel.

It is to be noted that the concrete structure of the light adjusting structure 20 is not limited, as long as light emitted from the first display units 11 is transmitted to the first visible area, and light emitted from the second display units 12 is transmitted to the second visible area.

Embodiments of the present disclosure provide a display device. By means of the light adjusting structure 20, light emitted from the first display units 11 in the display panel 10 is transmitted to the first visible area, and light emitted from the second display units 12 in the display panel is transmitted to the second visible area, such that the first image displayed by the first display units 11 may be watched in the first visible area, and the second image displayed by the second display units 12 may be watched in the second visible area. Therefore, when the display device is applied to the vehicle, a driver and a passenger may see different images without interfering with each other, and thus user's experience is enhanced.

Figure 2:
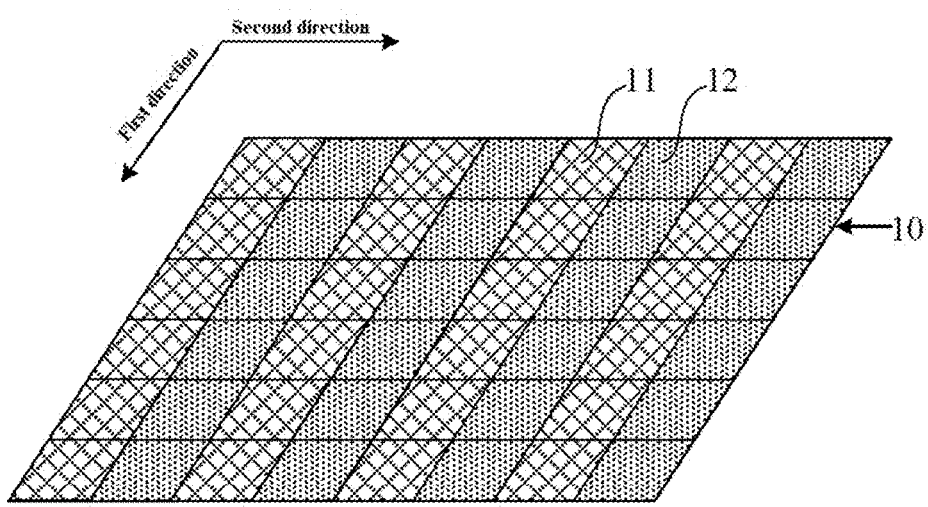
FIG. 2 is a schematic diagram I of a display panel according to the present disclosure.

As shown in FIG. 2, both the first display units 11 and the second display units 12 are arrayed in rows along a first direction. Along a second direction, a first display group constituted by at least one row of the first display units 11 and a second display group constituted by at least one row of the second display units 12 are alternately arranged. The first direction intersects with the second direction. It is to be understood that any row of first display units 11 in the first display group are the first display units 11 arrayed in row along the first direction. Similarly, any row of second display units 12 in the second display group are the second display units 12 arrayed in rows along the first direction.

On this basis, in an embodiment, along the second direction, the first display units 11 and the second display units 12 are alternately arranged. That is, one row of the first display units 11 constitutes a first display group, and one row of the second display units 11 constitutes a second display group.

Thus, the light adjusting structure 20 is only needed to be arranged to transmit light emitted from a plurality of rows of the first display units 11 spaced along the second direction to the first visible area and transmit light emitted from a plurality of rows of the second display units 12 spaced along the second direction to the second visible area, therefore the specific structure of the light adjusting structure 20 is relatively simple.

On this basis, as shown in FIG. 3-FIG. 6, the light adjusting structure 20 includes a plurality of lens groups 21. Each of the lens groups 21 includes a first strip-shaped lens 211 and a second strip-shaped lens 212, and the first strip-shaped lens 211 and the second strip-shaped lens 212 respectively correspond to a group of the first display groups and a group of the second display groups adjacent along the second direction.

It is to be understood that the first strip-shaped lens 211 and the second strip-shaped lens 212 extend along the first direction.

When the first direction is a column direction, sub-pixels or pixels in odd-numbered columns may be the first display units 11, and sub-pixels or pixels in even-numbered columns may be the second display units 12.

Both the first strip-shaped lens 211 and the second strip-shaped lens 212 include a light incident surface and a light-emitting surface. The light incident surface may be parallel and close to the display surface of the display panel 10, and the light-emitting surface is configured to refract a light ray such that the light ray is transmitted to a predetermined location (referring to the light paths in FIG. 3-FIG. 6).

For the light-emitting surfaces of the first strip-shaped lens 211 and the second strip-shaped lens 212, angles of the first strip-shaped lens 211 and the second strip-shaped lens 212 with respect to the display panel 10 may be determined based on refractive indexes of the first strip-shaped lens 211 and the second strip-shaped lens 212 and optimum observation locations.

Figure 7:
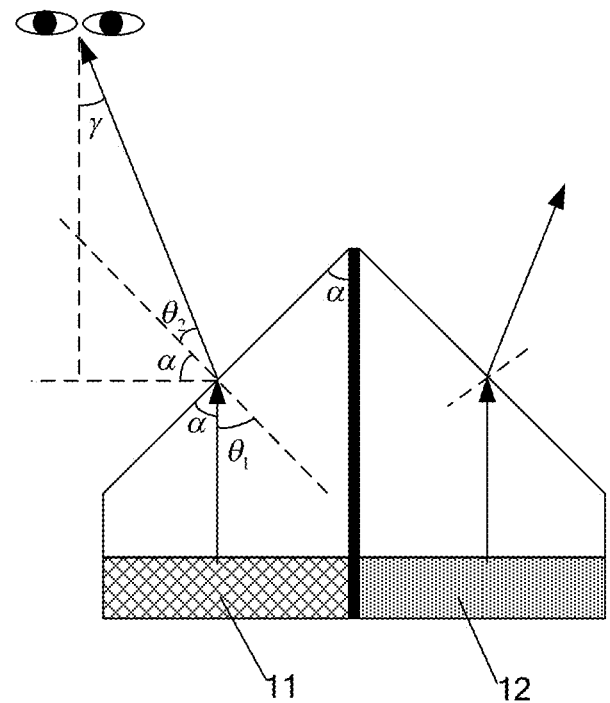
FIG. 7 is a schematic diagram showing a light path in which light rays are transmitted to a lens group according to the present disclosure.

Specifically, as shown in FIG. 7, an inclined plane of the first strip-shaped lens 211 is the light-emitting surface, supposing an included angle between the light-emitting surface and a vertical plane is a and the refractive index of the first strip-shaped lens 211 is $\beta$, it is obtained based on the refractive index formula $\beta = \sin\theta_2/\sin\theta_1$ that $\sin\theta_2 = \beta \sin\theta_1 = \beta \cos\alpha$, which is Formula 1.

Formula 2 is $\sin\theta_2 = \sin(90°-\alpha-\gamma) = \sin(90°-(\alpha+\gamma)) = \cos(\alpha+\gamma)$.

By taking Formula 2 into Formula 1, it is obtained $\cos(\alpha+\gamma) = \beta \cos\alpha$, which is Formula 3.

Figure 8:
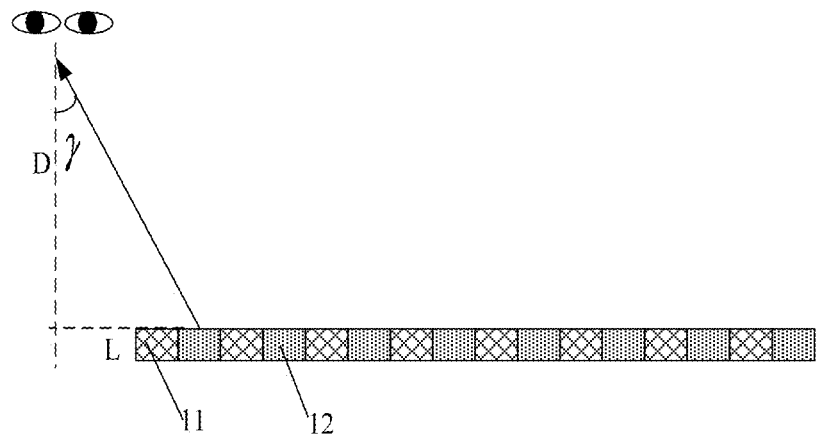
FIG. 8 is a schematic diagram of a light path of a display device according to the present disclosure.

As shown in FIG. 8, supposing a vertical distance from the optimum observation location of the first visible area to the display device is D and the horizontal distance from the optimum observation location of the first visible area to the first display unit 11 is L, it is obtained $\tan\gamma = L/D$. It is to be understood that L is varying based on different number of columns of the first display units 11.

On this basis, in case that D and L are known, the value of $\gamma$ may be calculated. On this basis, since $\beta$ also is known, the value of a may be calculated by taking the values of $\beta$ and $\gamma$ into Formula 3. In this way, the angle of the light-emitting surface of each first strip-shaped lens 211 with respect to the display surface of the display panel 10 may be obtained.

The angle of the light-emitting surface of each second strip-shaped lens 212 with respect to the display surface of the display panel 10 may be calculated based on the above formula, which is not repeated any more herein.

In the embodiments of the present disclosure, the first strip-shaped lens 211 and the second strip-shaped lens 212 in each lens group 21 respectively correspond to a group of the first display groups and a group of the second display groups adjacent along the second direction, and the angle of the light-emitting surface of each first strip-shaped lens 211 with respect to the display panel 10 and the angle of the light-emitting surface of each second strip-shaped lens 212 with respect to the display panel 10 are controlled. In this way, light emitted from the first display unit 11 is transmitted to the first visible area, and light emitted from the second display unit 12 is transmitted to the second visible area.

Further, as shown in FIG. 3-FIG. 6, the first strip-shaped lens 211 includes a first side perpendicular to the display panel 10, and the second strip-shaped lens 212 includes a second side perpendicular to the display panel 10. In each of the lens groups 21, the first side is parallel and close to the second side. The lens group 21 further includes a first light shielding layer 213 arranged between the first side and the second side and coming into contact with the first side and the second side.

Material of the first light shielding layer 213 includes an opaque material. On this basis, in an embodiment, the material of the first light shielding layer 213 includes a black light-absorbing material to absorb light transmitted to the first side and the second side. In this way, it is avoided the problem of unclear pictures in two visible areas caused by that light is transmitted to and reflected by the first side and the second side and refracted by a light-emitting surface, which has a negative effect on a normal light path where light is directly transmitted to a light-emitting surface and is refracted by the light-emitting surface.

The mutually adjacent first side and second side of the first strip-shaped lens 211 and the second strip-shaped lens 212 in the lens group 21 are fabricated into a straight surface perpendicular to the display panel 10, such that it is more easily to fabricate the lens group 21. On this basis, light rays transmitted from the first display unit 11 to the second visible area and light rays transmitted from the second display unit 12 to the first visible area may be reduced by arranging the first light shielding layer 213 between the first strip-shaped lens 211 and the second strip-shaped lens 212, so as to achieve the objective of reducing mutual interference between the first display unit 11 and the second display unit 12.

Further in an embodiment, as shown in FIG. 3-FIG. 6, an orthographic projection of the first light shielding layer 213 on the display panel 10 completely overlaps with a black matrix of the display panel 10. In this way, a negative effect on light transmittance may be avoided.

In an embodiment, along a direction perpendicular to the display surface of the display panel 10, a height of the first light shielding layer 213 is equal to a maximum height of the first side and the second side.

That is, when the height of the first side is greater than that of the second side, the height of the first light shielding layer 213 is equal to that of the first side. When the height of the first side is smaller than that of the second side, the height of the first light shielding layer 213 is equal to that of the second side. When the height of the first side is equal to that of the second side, the height of the first light shielding layer 213 is equal to that of the first side and of the second side.

In this way, the height of the first light shielding layer 213 may be as high as possible to further avoid the problem of mutual interference with light emission between the first display unit 11 and the second display unit 12.

Figure 3:
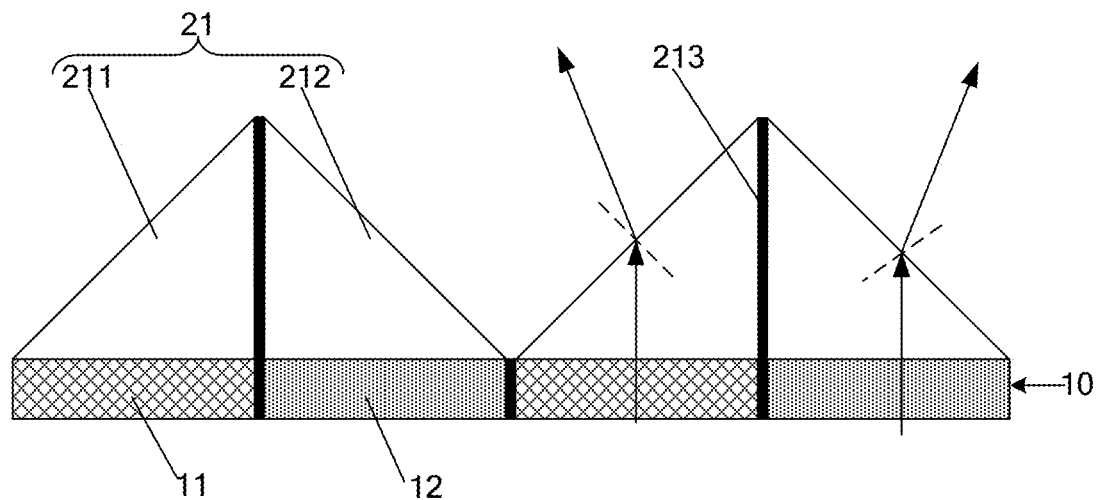
FIG. 3 is a schematic diagram II of a display device according to the present disclosure.

In an embodiment, as shown in FIG. 3, both the first strip-shaped lens 211 and the second strip-shaped lens 212 include a right-angled triangle strip-shaped lens. Based on this, light emitted from the first display unit 11 may be transmitted to the first visible area and light emitted from the second display unit 12 may be transmitted to the second visible area by controlling angles of inclined planes of the first strip-shaped lens 211 and the second strip-shaped lens 212.

Figure 5:
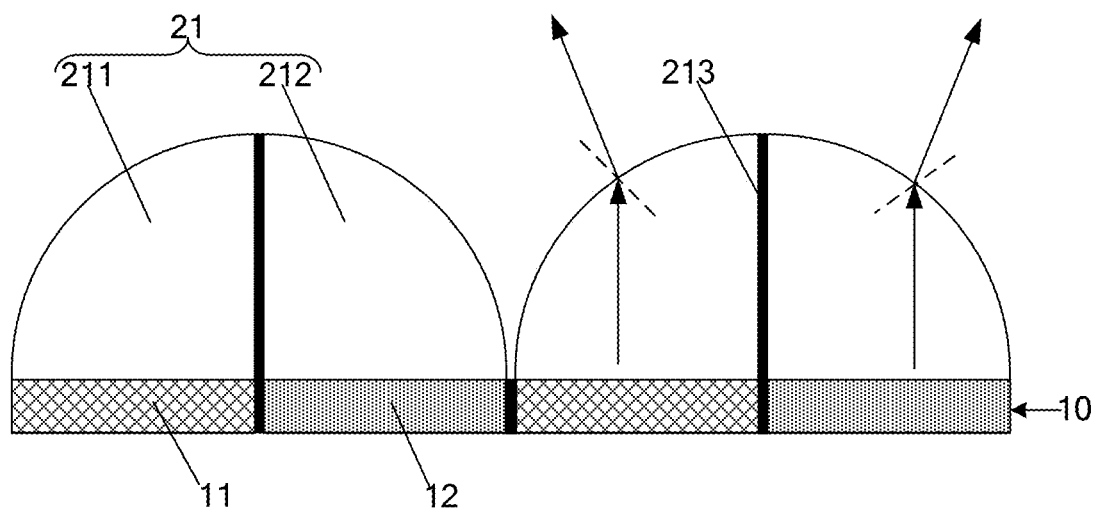
FIG. 5 is a schematic diagram IV of a display device according to the present disclosure.

In an embodiment, as shown in FIG. 5, both the first strip-shaped lens 211 and the second strip-shaped lens 212 include a fan-shaped strip-shaped lens. Based on this, light emitted from the first display unit 11 may be transmitted to the first visible area and light emitted from the second display unit 12 may be transmitted to the second visible area by controlling radians of arc-shaped planes of the first strip-shaped lens 211 and the second strip-shaped lens 212.

On this basis, a second light shielding layer also may be arranged between adjacent lens groups 21 to reduce mutual interference with light rays between the display units corresponding to the adjacent lens groups 21. The material of the second light shielding layer may be the same as that of the first light shielding layer 213.

How to arrange the second light shielding layer between the adjacent lens groups 21 is not limited here as long as the second light shielding layer fixed to the lens groups 21 can be formed between the lens groups 21. For example, the second light shielding layer may be directly formed between two light-emitting surfaces of the adjacent lens groups 21.

Figure 4:
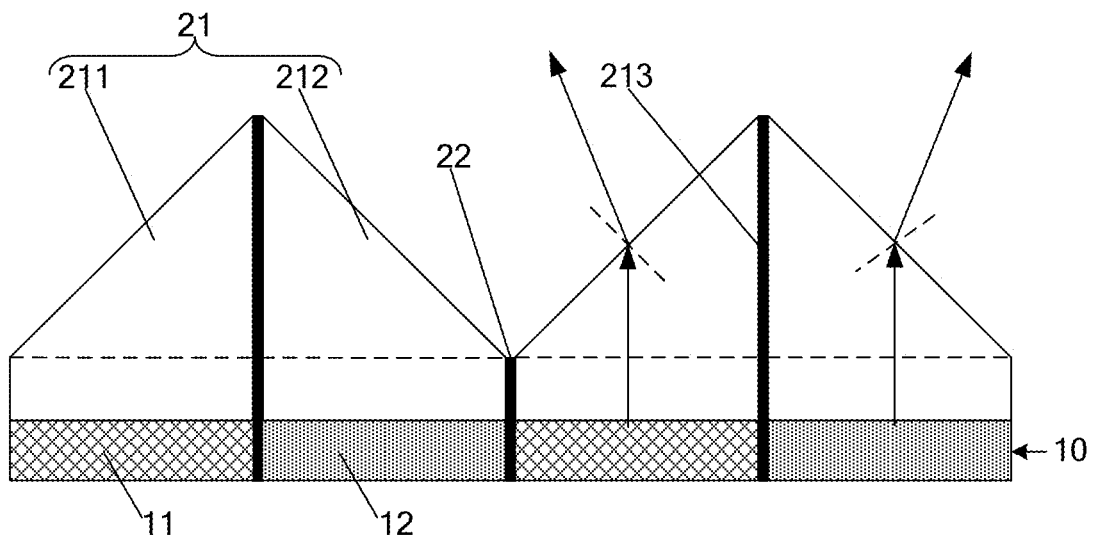
FIG. 4 is a schematic diagram III of a display device according to the present disclosure.

Further, in case that both the first strip-shaped lens 211 and the second strip-shaped lens 212 include the right-angled triangle strip-shaped lens, as shown in FIG. 4, the first strip-shaped lens 211 and the second strip-shaped lens 212 may further include a rectangular bottom, and the right-angled triangle strip-shaped lens is arranged on the rectangular bottom. The second light shielding layer 22 is arranged between the rectangular bottoms of the adjacent lens groups 21.

Figure 6:
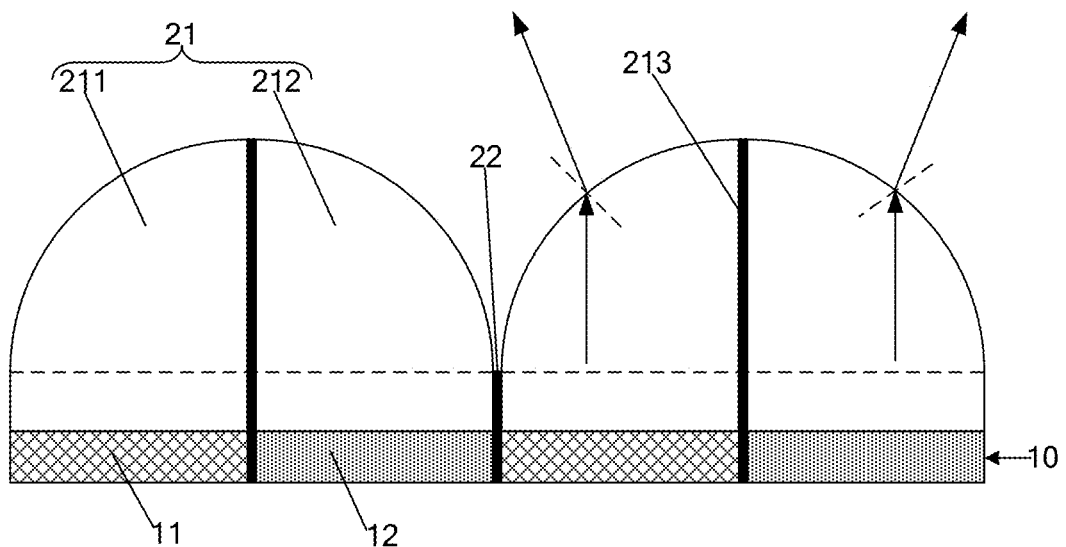
FIG. 6 is a schematic diagram V of a display device according to the present disclosure.

In case that both the first strip-shaped lens 211 and the second strip-shaped lens 212 include a ¼ circular (fan-shaped) strip-shaped lens, as shown in FIG. 6, the first strip-shaped lens 211 and the second strip-shaped lens 212 may further include a rectangular bottom, and the fan-shaped strip-shaped lens is arranged on the rectangular bottom. The second light shielding layer 22 is arranged between the rectangular bottoms of the adjacent lens groups 21.

It is to be noted that when the first strip-shaped lens 211 and the second strip-shaped lens 212 include the rectangular bottom, the rectangular bottom and the right-angled triangle strip-shaped lens or the fan-shaped strip-shaped on the rectangular bottom constitute an integrated structure.

The first strip-shaped lens 211 and the second strip-shaped lens 212 include the rectangular bottom, which may make it easy to arrange the second light shielding layer 22 without causing any effect on light emission.

Further in an embodiment, as shown in FIG. 4 and FIG. 6, the orthographic projection of the second light shielding layer 22 on the display panel 10 completely overlaps with a black matrix of the display panel 10. In this way, a negative effect on light transmittance may be avoided.

On this basis, it is to be understood that both the first strip-shaped lens 211 and the second strip-shaped lens 212 are positioned between the first light shielding layer 213 and the second light shielding layer 22 which are adjacent.

In an embodiment, along the direction perpendicular to the display surface of the display panel 10, the height of the second light shielding layer 22 is equal to that of the rectangular bottom.

The rectangular bottom of the first strip-shaped lens 211 is equal to that of the second strip-shaped lens 212 in height.

In this way, by reasonably setting the height of the rectangular bottom, the problem of mutual interference with light rays between the display units corresponding to the adjacent lens groups 21 may be maximally avoided.

On the basis of the above description, in an embodiment, both the first display unit 11 and the second display unit 12 are pixel units. The pixel unit includes at least three sub-pixels.

Thus, the number of the lens groups 21 may be less, and it is easy to fabricate the lens groups 21.

A method for displaying two different images on the display panel 10 is introduced below. For ease of understanding, the first direction is set as a vertical direction, and the second direction is set as a horizontal direction.

Figure 9:
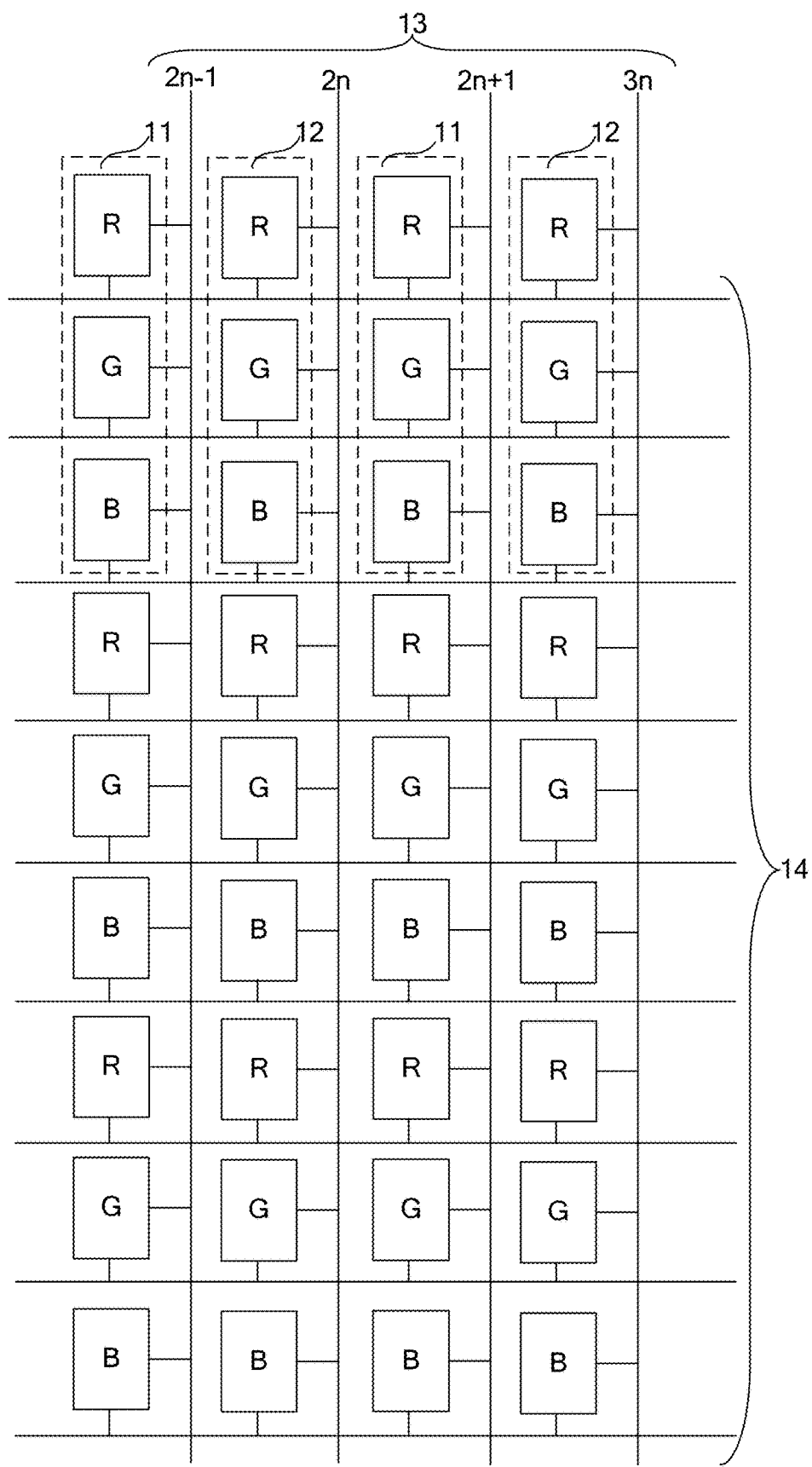
FIG. 9 is a schematic diagram II of a display panel according to the present disclosure.

As shown in FIG. 9, gate lines 13 may extend along the vertical direction, data lines 14 may extend along the horizontal direction, and the gate lines 13 and the data lines 14 are intersected to define sub-pixels. Along the vertical direction, red sub-pixels R, green sub-pixels G and blue sub-pixels B are sequentially arranged. In each of all odd-numbered columns, the red sub-pixel R, the green sub-pixel G and the blue sub-pixel B that are continuous constitute one first display unit 11. In each of all even-numbered columns, the red sub-pixel R, the green sub-pixel G and the blue sub-pixel B that are continuous constitute one second display unit 12. In FIG. 9, n is a positive integer greater than or equal to 1.

Figure 10:
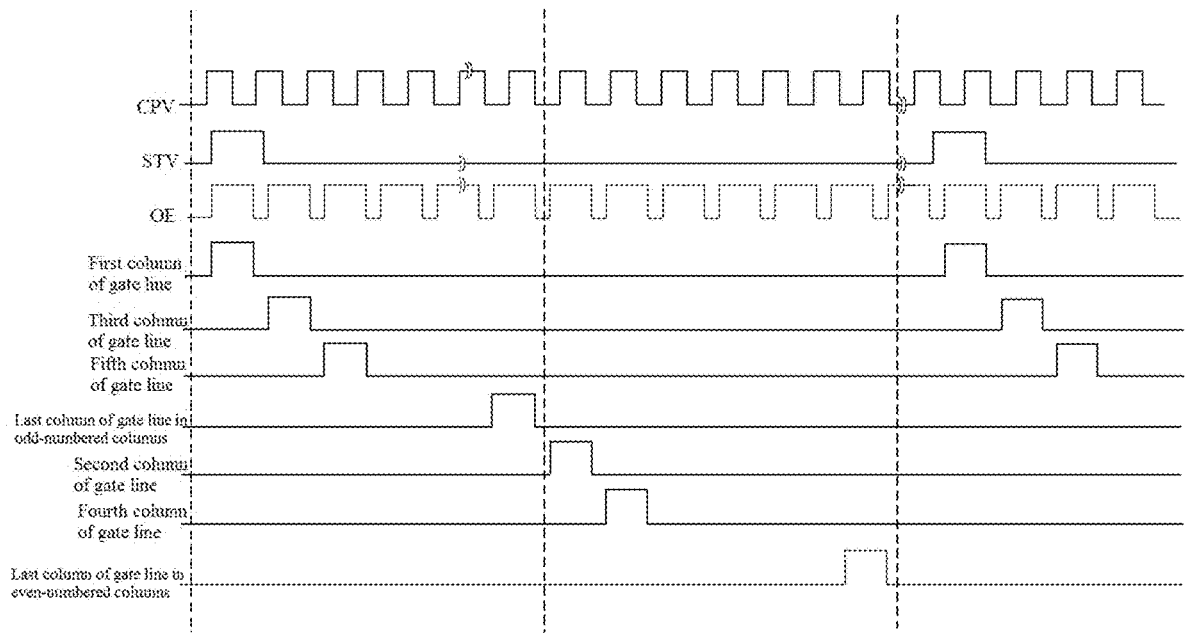
FIG. 10 is a schematic diagram of timing sequences of displaying a first image and a second image according to the present disclosure.

Based on this, as shown in FIG. 10, when the gate lines 13 are scanned, only odd-numbered columns of gate lines 13 may be first scanned, and in the meanwhile, the data lines 14 transmit data of the mth frame of the first image, such that all the first display units 11 display the first image. After the first image is refreshed, even-numbered columns of gate lines 13 are scanned, and in the meanwhile, the data lines 14 transmit data of the mth frame of the second image, such that all the second display units 12 display the second image. Next, the above procedures are repeated. In this way, displaying different images by the display device in odd/even-numbered columns of pixels may be implemented.

Figure 11:
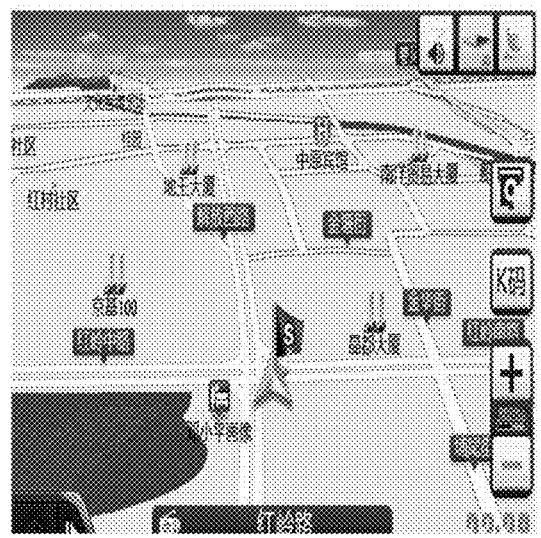
FIG. 11 is a schematic diagram of a first image according to the present disclosure.
Figure 12:
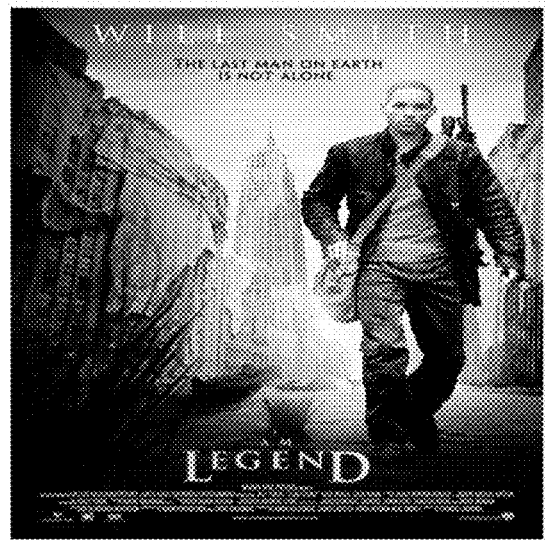
FIG. 12 is a schematic diagram of a second image according to the present disclosure.
Figure 13:
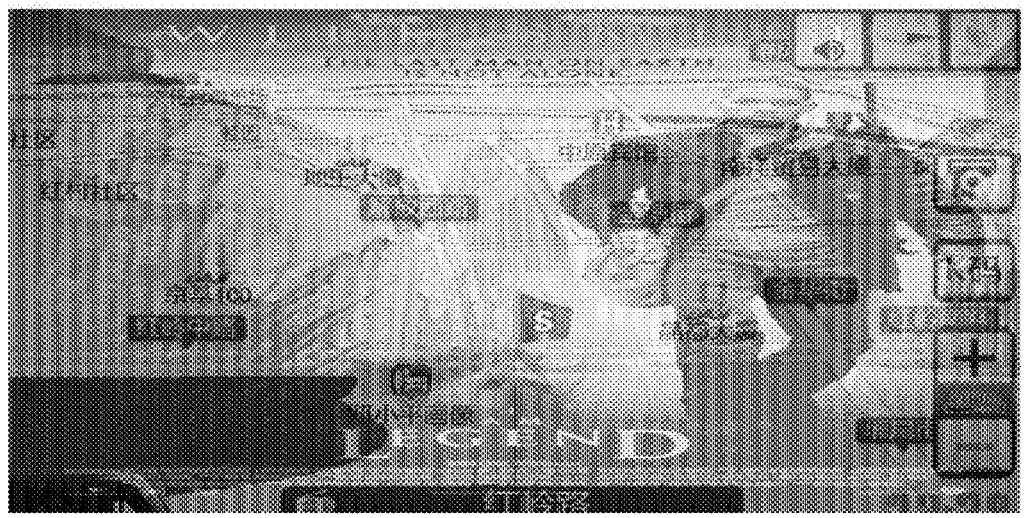
FIG. 13 is an image displayed on the display device based on FIG. 11 and FIG. 12.

Supposing the first image is as shown in FIG. 11 and the second image is as shown in FIG. 12, a processing module of the display device sequentially and alternately extracts the first image and the second image column by column and splices the first image and the second image into the image as shown in FIG. 13. The display panel displays the image, such that a watcher in the first visible area may see the first image, and a watcher in the second visible area may see the second image.

Sequentially and alternately extracting the first image and the second image column by column may, for example, include: sequentially extracting the first column of the first image, the first column of the second image, the second column of the first image, the second column of the second image, the third column of the first image, the third column of the second image, and so on. Based on this, it is to be understood that the resolution of the first image and the second image is a half of that of the spliced image.

Of course, in actual operation procedures, sequentially and alternately extracting the first image and the second image column by column also may include: sequentially extracting the first column of the first image, the second column of the second image, the third column of the first image, the fourth column of the second image, the fifth column of the first image, the sixth column of the second image, and so on. In an embodiment, sequentially and alternately extracting the first image and the second image column by column may include: sequentially extracting the first column of the first image, the first column of the second image, the third column of the first image, the third column of the second image, the fifth column of the first image, the fifth column of the second image, and so on. In an embodiment, similar to the above, only a half of the first image and a half of the second image are extracted. Based on these methods, it is to be understood that the first image, the second image and the spliced image are consistent in resolution.

To implement displaying the second image after refreshing the first image, when the gate lines 13 are driven for scanning, at least one first gate driver IC may be connected to odd-numbered columns of gate lines 13, and at least one second gate driver IC may be connected to even-numbered columns of gate lines 13. When a plurality of first gate driver ICs are connected to odd-numbered columns of gate lines 13, these first gate driver ICs are sequentially connected in cascade. That is, an input terminal of the second one of the first gate driver ICs is connected to the last output terminal of the first one of the first gate driver ICs, and the input terminal of the third one of the first gate driver ICs is connected to the last output terminal of the second one of the first gate driver ICs, and so on. Similarly, when a plurality of second gate driver ICs are connected to even-numbered columns of gate lines 13, these second gate driver ICs are sequentially connected in cascade. That is, the input terminal of the second one of the second gate driver ICs is connected to the last output terminal of the first one of the second gate drivers IC, and the input terminal of the third one of the second gate driver ICs is connected to the last output terminal of the second one of the second gate driver ICs, and so on. The input terminal of the first one of the second gate driver ICs is connected to the last output terminal of the last one of the first gate driver ICs.

Thus, as shown in FIG. 10, when the mth frame of the first image and the mth frame of the second image are displayed, a start vertical (STV) signal is inputted, the first one of the first gate driver ICs may sequentially drive odd-numbered columns of gate lines 13 connected thereto for scanning, and then the second one of the first gate driver ICs sequentially drives odd-numbered columns of gate lines 13 connected thereto for scanning, and so on until the last one of the first gate driver ICs sequentially drives odd-numbered columns of gate lines 13 connected thereto for scanning. At this moment, all odd-numbered columns of gate lines 13 are scanned, and the first image is displayed. The input terminal of the first one of the second gate driver ICs is connected to the last output terminal of the last one of the first gate driver ICs. Therefore, immediately after the last column of odd-numbered columns of gate lines 13 is driven for scanning, the first one of the second gate driver ICs may sequentially drive even-numbered columns of gate lines 13 connected thereto for scanning, and then the second one of the second gate driver ICs sequentially drives even-numbered columns of gate lines 13 connected thereto for scanning, and so on until the last one of the second gate driver ICs sequentially drives even-numbered columns of gate lines 13 connected thereto for scanning. At this moment, all even-numbered columns of gate lines 13 are scanned, and the second image is displayed.

It is to be noted that both the first gate driver IC and the second gate driver IC also need to input an output enable (OE) signal and a clock pulse vertical (CPV) signal.

Moreover, the number of the first gate driver ICs depends on the number of supported channels and the total number of odd-numbered columns of gate lines 13 of the display panel 10. The number of the second gate driver ICs depends on the number of supported channels and the total number of even-numbered columns of gate lines 13 of the display panel 10.

The embodiments of the present disclosure further provide a vehicle, including the above display device. Based on this, a driver may see the first image (for example, information related to vehicle driving such as a map), and a passenger in a passenger seat may see the second image (entertainment programs such as television programs or movies). Thus, the driver and the passenger watch the same display device but see different displayed contents.

The abovementioned embodiments are merely specific embodiments of the present disclosure, but the protection scope of the present disclosure is not limited thereto. Any variation or substitution easily conceivable to a person of ordinary skills in the art within the technical scope disclosed in the present disclosure shall fall within the protection scope of the present disclosure. Therefore, the protection scope of the present disclosure shall be subject to the protection scope of the claims.

What is claimed is:

1. A display device, comprising: a display panel and a light adjusting structure arranged at a light exiting side of the display panel; wherein the light adjusting structure is configured to adjust a direction of exit light from the display panel, such that a first image displayed by all first display units in the display panel and a second image displayed by all second display units in the display panel are respectively transmitted to a first visible area and a second visible area, wherein both the first display units and the second display units are arrayed in rows along a first direction; and a first display group constituted by at least one row of the first display units and a second display group constituted by at least one row of the second display units are alternately arranged along a second direction, and the first direction intersects with the second direction, wherein the light adjusting structure comprises a plurality of lens groups, each of the lens groups comprises a first strip-shaped lens and a second strip-shaped lens, the first strip-shaped lens is disposed to correspond to the first display group, and is configured to transmit light from the first display group to the first visible area, and the second strip-shaped lens is disposed to correspond to the second display group, and is configured to transmit light from the second display group to the second visible area.

2. The display device according to claim 1, wherein the first display group is constituted by one row of the first display units; and the second display group is constituted by one row of the second display units.

3. The display device according to claim 1, wherein the first strip-shaped lens and the second strip-shaped lens respectively correspond to a group of the first display groups and a group of the second display groups adjacent along the second direction.

4. The display device according to claim 3, wherein the first strip-shaped lens comprises a first side perpendicular to the display panel, the second strip-shaped lens comprises a second side perpendicular to the display panel; in each of the lens groups, the first side is parallel and close to the second side; and the lens group further comprises a first light shielding layer arranged between the first side and the second side and coming into contact with the first side and the second side face.

5. The display device according to claim 4, wherein an orthographic projection of the first light shielding layer on the display panel completely overlaps with a black matrix of the display panel.

6. The display device according to claim 4, wherein along a direction perpendicular to a display surface of the display panel, a height of the first light shielding layer is equal to a maximum height of the first side and the second side.

7. The display device according to claim 3, wherein both the first strip-shaped lens and the second strip-shaped lens comprise one of a right-angled triangle strip-shaped lens and a fan-shaped strip-shaped lens.

8. The display device according to claim 3, wherein a second light shielding layer is further arranged between the adjacent lens groups.

9. The display device according to claim 8, wherein both the first strip-shaped lens and the second strip-shaped lens comprise one of a right-angled triangle strip-shaped lens and a fan-shaped strip-shaped lens and a rectangular bottom, and the right-angled triangle strip-shaped lens and the fan-shaped strip-shaped lens is arranged on the rectangular bottom; and the second light shielding layer is arranged between the rectangular bottoms of the adjacent lens groups.

10. The display device according to claim 9, wherein an orthographic projection of the second light shielding layer on the display panel completely overlaps with a black matrix of the display panel.

11. The display device according to claim 9, wherein along a direction perpendicular to the display surface of the display panel, a height of the second light shielding layer is equal to that of the rectangular bottom.

12. The display device according to claim 1, wherein the first display units and the second display units are pixel units.

13. A vehicle, comprising a display device, wherein the display device comprises: a display panel and a light adjusting structure arranged at a light exiting side of the display panel; wherein the light adjusting structure is configured to adjust a direction of exit light from the display panel, such that a first image displayed by all first display units in the display panel and a second image displayed by all second display units in the display panel are respectively transmitted to a first visible area and a second visible area, wherein both the first display units and the second display units are arrayed in rows along a first direction; and a first display group constituted by at least one row of the first display units and a second display group constituted by at least one row of the second display units are alternately arranged along a second direction, and the first direction intersects with the second direction, wherein the light adjusting structure comprises a plurality of lens groups, each of the lens groups comprises a first strip-shaped lens and a second strip-shaped lens, the first strip-shaped lens is disposed to correspond to the first display group, and is configured to transmit light from the first display group to the first visible area, and the second strip-shaped lens is disposed to correspond to the second display group, and is configured to transmit light from the second display group to the second visible area.

14. The vehicle according to claim 13, wherein the first display group is constituted by one row of the first display units; and the second display group is constituted by one row of the second display units.

15. The vehicle according to claim 13, wherein the first strip-shaped lens and the second strip-shaped lens respectively correspond to a group of the first display groups and a group of the second display groups adjacent along the second direction.

16. The vehicle according to claim 15, wherein the first strip-shaped lens comprises a first side perpendicular to the display panel, the second strip-shaped lens comprises a second side perpendicular to the display panel; in each of the lens groups, the first side is parallel and close to the second side; and the lens group further comprises a first light shielding layer arranged between the first side and the second side and coming into contact with the first side and the second side face.

17. The vehicle according to claim 16, wherein an orthographic projection of the first light shielding layer on the display panel completely overlaps with a black matrix of the display panel.

18. The vehicle according to claim 16, wherein along a direction perpendicular to a display surface of the display panel, a height of the first light shielding layer is equal to a maximum height of the first side and the second side.

* * * * *